United States Patent Office 3,535,632
Patented Oct. 20, 1970

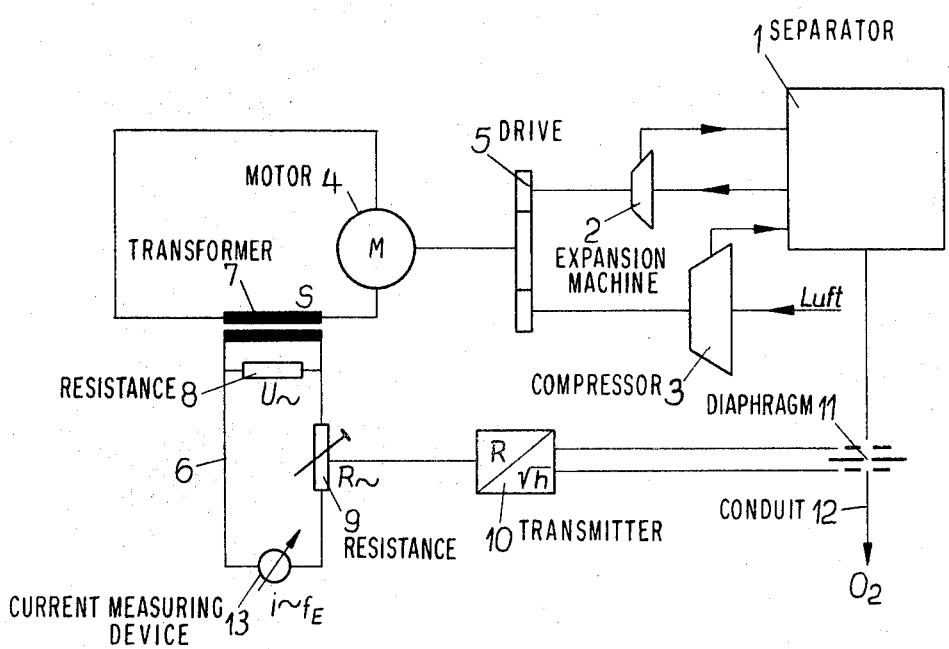

3,535,632
APPARATUS FOR DETERMINING THE ENERGY FACTOR IN AIR SEPARATION PLANTS
Ernst A. Rische, Duisburg, Germany, assignor to Messer Griesheim G.m.b.H., Frankfurt am Main, Germany, a corporation of Germany
Filed Dec. 20, 1967, Ser. No. 692,159
Claims priority, application Germany, Dec. 30, 1966, M 72,243
Int. Cl. G01r *31/02;* G01l *3/26;* G01m *15/00*
U.S. Cl. 324—71                 5 Claims

ABSTRACT OF THE DISCLOSURE

Arrangement for determining the energy factor, which is particularly useful in air separation plants, is characterized by conducting the work of compression from the motor to an electrical circuit as a voltage value and the amount of oxygen produced as a resistance value, so that the current measuring instrument of the testing circuit indicates the energy factor proportional to the current intensity whereby, in accordance with Ohm's Law, the current intensity equals the quotient of the voltage and resistance.

BACKGROUND OF INVENTION

Previously the energy factor of an air-separation plant, which indicates the most economical manner of operation and is calculated by the quotient of energy expenditure and amount of oxygen produced, was determined by individual measurements carried out on all energy consumers which were evaluated with regard to the work done at the expansion machine by the preparation of a scheduled tabulation and by carrying out the calculating operations. However, this process is rather complicated and time-consuming; furthermore, in evaluating the measuring results, errors can occur which are not noticed and which then lead to inaccurate results. Finally, a direct influence of the apparatus drive on the basis of the determination of the energy factor in this type of evaluation can occur relatively late, since no immediate measuring value is received.

SUMMARY OF INVENTION

The object of this invention is to replace the disadvantageous earlier process by a direct measuring process which immediately yields the energy factor, so that the plotting of individual measuring values and their evaluation is eliminated, and an immediate change is possible in the operation of the air separation plant on the basis of the measured values.

This object is achieved, according to the invention, in a simple and advantageous manner in that the work of compression carried out by the motor is conducted to an electric testing circuit as a voltage value and the amount of oxygen produced as a resistance value, with the current measuring instrument of the testing circuit indicating the energy factor proportional to the current intensity, where according to Ohm's Law the current intensity is equal to the quotient of voltage value and resistance value.

The novel process has the advantage that with the aid of a simple electric switch, an instantaneous indication of the energy factor is possible without first having to prepare and evaluate test result tabulations.

An arrangement for the carrying out of the novel process, in an advantageous further development of the invention, consists of a testing current with resistances, a current measuring device and a measuring transformer series connected to the driving motor. The transformer feeds the voltage value into the testing circuit in proportion to the compression work carried out. The compressor and the expansion machine of the separating apparatus can be connected to a drive coordinated with a driving motor, the drive serving for forming the difference between the work of compression and the work gained in the expansion. The measuring values for the oxygen amounts produced can be received by a diaphragm situated in the oxygen conduit of the separating apparatus and can be conducted to an evolving resistance connected to a transmitter, the resistance being situated in the testing current. In the testing current there can be provided, analogously digital converting devices for the numerical indication of the energy factor. If a plotting of the energy factor test results is desired, then a current measuring device with a writing or printing arrangement can be provided in the measuring current. However, if the average of the energy factor is to be formed over a preset time span, then integrated facilities can be provided in the measuring current.

THE DRAWING

The single figure schematically shows an arrangement in accordance with this invention.

DETAILED DESCRIPTION

In the drawing, there is schematically illustrated as the embodiment of the invention, an air-separation plant with a testing circuit consisting of a separating apparatus 1, the expansion machine 2, the compressor 3 and the driving motor 4. Between driving motor 4 and expansion machine 2 as well as compressor 3, a drive 5 is switched on which transfers to compressor 3 the work obtained in the expansion machine 2 during refrigeration.

The testing circuit 6 is composed of the measuring transformer 7, resistance 8, reducing resistance 9 with transmitter 10, which is connected to diaphragm 11 of the oxygen conduit 12, and current measuring device 13 indicating the energy factor.

Designated as the energy factor is the value $$f_\mathrm{E} = \frac{\text{enery expenditure}}{\text{O}_2 \text{ amount produced}} \left(\frac{kwh.}{nm^3.}\right)$$

Energy expenditure is first of all determined by the performance $N_\mathrm{K}$ of the air compressor. The output $N_\mathrm{ET}$ obtained in the expansion turbine is to be drawn therefrom if necessary. Consequently, the energy expenditure is:

Energy expenditure $= N_\mathrm{K} - N_\mathrm{ET}$

The oxygen amount produced is composed of yield of gaseous and liquid oxygen. Since the energy expenditure for the production of liquid oxygen is 2.8 times as great as that of gaseous oxygen, there results for the oxygen amount:

Oxygen amount $= Q_\mathrm{g} + 2.8 \times Q_\mathrm{f}$

Using Ohm's Law, the energy factor $f_\mathrm{E}$ is easily determined if a voltage is formed in proportion to the value $N_\mathrm{K} - N_\mathrm{ET}$ and a resistance in proportion to the value $Q_\mathrm{g} + 2.8 \times Q_\mathrm{f}$. Then according to Ohm's Law the current in the circuit is proportional to the energy factor, i.e.

$$f_\mathrm{E} = C \times i$$

The voltage proportional to the output is obtained by tapping on the measuring transformer 7 series connected to the driving motor 4. Usually, in this connection, $N_\mathrm{ET}$ can be omitted in the first approach as compared to $N_\mathrm{K}$. The resistance proportional to $Q_\mathrm{g}$ is obtained by the evolving resistance 9, which is connected to the diaphragm 11 for measuring the $O_2$ amount. The liquid production $Q_\mathrm{f}$ is taken care of by a resistance which is changed in proportion to the output of the expansion turbine 2.

There exists the equation:

$$Qf = 7 \times (N_{ET} - N_V)$$

wherein $N_V$ is the power loss of the separating apparatus 1.

In decomposition plants with very variable manner of movement, especially very high liquid production, often several expansion machines are used. Then:

$$f_E = \frac{N_K - \Sigma N_{ET}}{Q_g + (\Sigma N_{ET} - N_V)} \left(\frac{kwh.}{nm^3.}\right)$$

For the production of the energy factor $f_E$, first voltages are produced which are proportional to the output $N_K$ or the individual outputs $N_{ET}$. From these is formed by means of electric networks a voltage proportional to the difference $N_K - N_{ET}$. Similarly, the resistances are produced in proportion to $Q_g$ and $N_{ET} - N_V$.

The invention is in no way limited to the embodiment illustrated in the drawing and described above. For example, there are many possible modifications in the construction of the plant and in the arrangement of the individual units without departing from the scope of the invention. One modification is to use integrated devices for obtaining the average of energy factor $f_E$ over a preset time span. If analogous digital converting devices are arranged in the measuring current, then a numerical indicating of the energy factor can be conducted. Finally, using pressure, a continuous plotting of the measured energy factor can occur.

What is claimed is:

1. An arrangement for the determination of the energy factor in air separation plants comprising, in combination, a separating apparatus having a gas conduit, a compressor and an expansion machine connected to said separating apparatus, a driving motor, drive means connecting said motor to said compressor and to said expansion machine for determining the difference between the work of compression and the work gained in expansion, converting means connected to said gas conduit for converting the amount of compressed gas from said separating apparatus into an electrical value, a testing circuit, said testing circuit including transforming means connected to said driving motor for feeding a voltage value into said testing circuit in proportion to the work of compression carried out by said driving motor, resistance means connected to said converting means for feeding the electrical value into said testing circuit as a resistance value, and current measuring means in said testing circuit for measuring the energy factor as the current intensity in accordance with Ohm's Law wherein the current intensity is equal to the quotient of the voltage value and the resistance value.

2. In the arrangement of claim 1 including analogously digital converting means in said testing circuit for numerically indicating the energy factor.

3. In the arrangement of claim 1 including printing means connected to said current measuring device for plotting the energy factor measuring values.

4. In the arrangement of claim 1 including integrating means in said testing circuit for taking the mean of the energy factor over a preset period.

5. In the arrangement of claim 1 wherein said gas is oxygen, said converting means including diaphragm means in said conduit, and a transmitter connected to said resistance means and said diaphragm means.

References Cited

UNITED STATES PATENTS

| | | | |
|---|---|---|---|
| 1,822,184 | 9/1931 | Wunsch | 324—71 X |
| 2,596,030 | 5/1952 | Junkins | 73—112 |
| 2,800,015 | 7/1957 | Shaw | 73—112 X |
| 2,892,914 | 5/1961 | Stewart | 324—111 |

FOREIGN PATENTS

| | | |
|---|---|---|
| 155,979 | 9/1962 | Russia. |
| 684,003 | 12/1952 | Great Britain. |

EDWARD E. KUBASIEWICZ, Primary Examiner

U.S. Cl. X.R.

73—112